(12) United States Patent
Yamada et al.

(10) Patent No.: US 6,968,822 B2
(45) Date of Patent: Nov. 29, 2005

(54) ENGINE

(75) Inventors: Kiichiro Yamada, Sakai (JP);
Shinkichi Iwasaki, Sakai (JP);
Takahiro Kajihara, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/924,221

(22) Filed: Aug. 23, 2004

(65) Prior Publication Data

US 2005/0103304 A1 May 19, 2005

(30) Foreign Application Priority Data

Nov. 14, 2003 (JP) .......................... P 2003-384946
Mar. 4, 2004 (JP) .......................... P 2004-061055

(51) Int. Cl.$^7$ ............................................ F02B 75/06
(52) U.S. Cl. .............................. 123/192.2; 123/195 HC
(58) Field of Search ....................... 123/192.2, 195 HC

(56) References Cited

FOREIGN PATENT DOCUMENTS

JP 2001-200893 A 7/2001

*Primary Examiner*—Noah P. Kamen
(74) *Attorney, Agent, or Firm*—Akin Gump Strauss Hauer & Feld, LLP

(57) ABSTRACT

Cap segment surfaces (9a) and (9b) of a larger-diameter end portion (7) of a connecting rod (5) are positioned at an upper and a lower portions of a crank pin (8) and are inclined from a right upper portion of the larger-diameter end portion (7) of the connecting rod (5) to a left lower portion thereof. A cap (10) is attached by connecting rod bolts (11a) and (11b), head portion (12a) and (12b) of which are arranged vertically along the inclination direction of the cap segment surfaces (9a) and (9b). With a piston (24) existing at a bottom dead center, a weight connection portion (15a) of an upper rotary balancer (4a) is provided with a recess (13a) at a portion oriented leftwards and downwards which comes to face the head portion (12a) of the upper connecting rod bolt (11a).

8 Claims, 14 Drawing Sheets

＃ ENGINE

BACKGROUND OF THE INVENTION

1. Technical Field of the Invention

The present invention relates to an engine.

2. Description of Related Art

An example of the conventional engines, as shown in FIG. 11, arranges a pair of upper and lower rotary balancers 104a and 104b on a right horizontal side of a crank shaft 103 and provides an opening 141 of a cylinder block 122 on a right horizontal side of the paired upper and lower rotary balancers 104a and 104b, which opening is closed by a closure 142, at a specific observation position with a cylinder 102 oriented horizontal on a left side of a center axis 101 of the crank shaft 103, when seen in a direction parallel to the center axis 101 of the crank shaft 103 as well as the present invention.

As shown in FIG. 11, at the specific observation position, with a piston 124 existing at a bottom dead center, the pair of the upper and lower rotary balancers 104a and 104b have weight connection portions 115a and 115b positioned on respective left horizontal sides of their rotation centers 143a and 143b. A gap 144 is formed between the both weight connection portions 115a and 115b when the piston 124 exists at the bottom dead center.

As shown in FIG. 14, at the specific observation position, with a larger-diameter end portion 107 of a connecting rod being present at a stroke intermediate position above the center axis 101 of the crank shaft 103, while the upper rotary balancer 104a has the weight connection portion 115a positioned above the center 143a of its rotation, the lower rotary balancer 104b has the weight connection portion 115b disposed below the center 143b of its rotation. A gap 146 is formed between the both weight connection portions 115a and 115b when the larger-diameter end portion 107 is present at the stroke intermediate position.

This conventional technique is different from the present invention on the following points.

As shown in FIG. 11, at the specific observation position, with a center axis 106 of the connecting rod oriented horizontal, a pair of upper and lower cap segment surfaces 109a and 109b of the larger-diameter end portion 107 of the connecting rod are positioned at an upper and a lower portions of a crank pin 108 and are made vertical. A cap 110 is attached by a pair of an upper and a lower connecting rod bolts 111a and 111b, head portions 112a and 112b of which are arranged vertically along the paired upper and lower cap segment surfaces 109a and 109b.

And as shown in FIG. 12, at the specific observation position, with the piston 124 existing at a position just after it has passed the bottom dead center, while the upper rotary balancer 104a has the weight connection portion 115a arranged at a left lower portion of the rotation center 143a, the lower rotary balancer 104b has the weight connection portion 115b disposed at a left upper portion of the rotation center 143b. A gap 144a is formed between the both weight connection portions 115a and 115b just after the piston 124 has passed the bottom dead center. The upper connecting rod bolt 111a has the head portion 112a opposed to the gap 144a from its right lower portion and has an axis an extension line 145a of which goes rightwards and downwards to pass through the gap 144a and the opening 141.

As shown in FIG. 13, at the specific observation position, with the piston 124 being present at a position just before it passes the bottom dead center, while the upper rotary balancer 104a has the weight connection portion 115a arranged at a left upper portion of its rotation center 143a, the lower rotary balancer 104b has the weight connection portion 115b positioned at a left lower portion of its rotation center 143b. A gap 144b is formed between the both weight connection portions 115a and 115b just before the piston 124 passes the bottom dead center. The lower connecting rod bolt 111b has the head portion 112b opposed to the gap 144b from its right upper portion. This lower connecting rod bolt 111b has an axis an extension line 145b of which goes rightwards and upwards to pass through the gap 144b and the opening 141.

And as shown in FIG. 14, at the specific observation position, with the larger-diameter end portion 107 of the connecting rod existing at an stroke intermediate position above the center axis 101 of the crank shaft 103, the lower connecting rod bolt 111b has the head portion 112b opposed to the gap 146 from its right portion. This connecting rod bolt 111b has the axis the extension line 145b of which goes rightwards and upwards to interfere with the upper weight connection portion 115a.

This conventional technique has the following problems.

<Problem 1> There Occurs Stagnation in the Work for Attaching and Detaching the Cap.

As shown in FIGS. 12 to 14, when conducting a predetermined maintenance work of the piston 124 or the like, there is a case where the closure 142 is removed and the paired connecting rod bolts 111a and 111b are removed by a socket wrench 147 to detach the cap 110 while retaining the paired rotary balancers 104a and 104b assembled to the cylinder block 122, and after the predetermined maintenance work has been completed, the cap 110 is attached to assemble the connecting rod bolts 111a and 111b by the socket wrench 147. In such a case, the lower connecting rod bolt 111b cannot be detached and attached at once to result in stagnating the work for attaching and detaching the cap 110.

More specifically, in the case of detaching the cap 110, first, after the engine has been brought into such a state that the piston 124 has just passed the bottom dead center as shown in FIG. 12, the straight socket wrench 147 is inserted into the cylinder block 122 through the opening 141 and a socket 148 at its leading end is inserted from the gap 144a along the extension line 145a of the axis of the upper connecting rod bolt 111a. The upper connecting rod bolt 111a has the head portion 112a fitted into the socket 148. Then the socket wrench 147 is rotated to dismantle the upper connecting rod bolt 111a. Next, after the engine has been brought into such a state that the piston 124 is just before passing the bottom dead center as shown in FIG. 13, the same socket wrench 147 is inserted through the opening 141 and the socket 148 at its leading end is inserted from the gap 144b along the extension line 145b of the axis of the lower connecting rod bolt 111b and the head portion 112b of the lower connecting rod bolt 111b is fitted into the socket 148. The socket wrench 147 is rotated to once loosen the lower connecting rod bolt 111b. Subsequently, after the engine has been brought into the stroke intermediate state as shown in FIG. 14, both hands are inserted from the opening 141 to the cylinder block 122 via the gap 146. While supporting the cap 110 by one hand, the lower connecting rod bolt 111b is dismantled by the other hand.

Next, in the case where the cap 110 is attached after having conducted the predetermined maintenance work, first, the engine is brought into the stroke intermediate state as shown in FIG. 14. Then the cap 110 and the lower connecting rod bolt 111b are held by both hands and are inserted from the opening 141 to the crank pin 108 via the gap 146. While supporting the cap 110 by one hand so that it dose not fall, the lower connecting rod bolt 111b is once temporarily fastened by the other hand. Subsequently, after having brought the engine into such a state that the piston 124 is just before passing the bottom dead center as shown in FIG. 13, the straight socket wrench 147 is inserted from the opening 141 into the cylinder block 122 and the socket 148 at the leading end is inserted from the gap 144b along the extension line 145b of the axis of the lower connecting rod bolt 111b. The head portion 112b of the lower connecting rod bolt 111b is fitted into the socket 148 and the socket wrench 147 is rotated to rigidly fasten the lower connecting rod bolt 111b. Next, the engine is brought into such a state that the piston 124 has just passed the bottom dead center as shown in FIG. 12 and thereafter the same socket wrench 147 has the socket 148 at the leading end, fitted onto the head portion 112a of the upper connecting rod bolt 111a, which is inserted into the cylinder block 122 through the opening 141. The socket 148 at the leading end is inserted from the gap 144a to the cap 110 with the upper connecting rod bolt 111a. The upper connecting rod bolt 111a is attached.

<Problem 2> The Engine is Produced at a High Cost.

When an engine of high exhaust amount is produced by borrowing a cylinder block 122 to be used for an engine of low exhaust amount and making a radius 123 from the center axis 101 of the crank shaft to a center of the crank pin 108 larger than that of the engine of low exhaust amount and making a dimension 127 from a center of a piston pin 125 to a piston head top surface 126 smaller than that of the engine of low exhaust amount, if the engine of high exhaust amount maintains such a structure that the cap segment surfaces 109a and 109b form a vertical surface as well as the engine of low exhaust amount, while the engine is in operation, the head portion 112a of the upper connecting rod bolt 111a interferes with an upper portion 128a of the crank shaft 103 in the crank case 128. Therefore, conventionally, in the case of producing the engine of high exhaust amount, there was prepared a separate cylinder block which is exclusively used for the engine of high exhaust amount and prevents the head portion 112a of the upper connecting rod bolt 111a from interfering with the upper portion 128a, without using the cylinder block 122 to be used for the engine of low exhaust amount. This entails a high production cost of the engine of high exhaust amount.

The present invention has an object to provide an engine capable of solving the problems. More specifically, the present invention provides an engine which enables a cap to be attached and detached quickly and can reduce the production cost.

SUMMARY OF THE INVENTION

As exemplified in FIG. 1, when seen in a direction parallel to a center axis 1 of a crank shaft 3, at a specific observation position with a cylinder 2 oriented horizontal on a left side of the center axis 1 of the crank shaft 3, there are arranged on a right horizontal side of the crank shaft 3 a pair of upper and lower rotary balancers 4a and 4b, on a right horizontal side of which an opening 41 of a cylinder block 22 is provided. The opening 41 is closed with a closure 42.

At the specific observation position, with a piston 24 existing at a bottom dead center, the paired upper and lower rotary balancers 4a and 4b have the respective weight connection portions 15a and 15b arranged on a left horizontal side of the respective centers 43a and 43b of the rotary balancers 4a and 4b. A gap 44 is formed between the both weight connection portions 15a and 15b when the piston 24 exists at the bottom dead center.

As exemplified in FIG. 2, at the specific observation position, with a larger-diameter end portion 7 of a connecting rod 5 being present at a stroke intermediate position above the center axis 1 of the crank shaft 3, the upper rotary balancer 4a has the weight connection portion 15a arranged above the rotation center 43a thereof and the lower rotary balancer 4b has the weight connection portion 15b disposed below the rotation center 43b thereof. A gap 46 is formed between the both weight connection portions 15a and 15b of the paired upper and lower rotary balancers 4a and 4b.

As exemplified in FIG. 1, at the specific observation position, with a center axis 6 of the connecting rod oriented horizontal, a pair of upper and lower cap segment surfaces 9a and 9b of the larger-diameter end portion 7 of the connecting rod 5 are positioned at an upper and a lower positions of the crank pin 8 and are inclined from a right upper portion of the larger-diameter end portion 7 to a left lower portion thereof. A cap 10 is attached by a pair of upper and lower connecting rod bolts 11a and 11b, head portions 12a and 12b of which are arranged vertically along the inclination direction of the paired upper and lower cap segment surfaces 9a and 9b.

At the specific observation position, with the piston 24 existing at the bottom dead center, the weight connection portion 15a of the upper rotary balancer 4a is provided with a recess 13a at a left lower portion which will oppose to the head portion 12a of the upper connecting rod bolt 11a.

At the specific observation position, with the piston 24 being present at the bottom dead center, the upper connecting rod bolt 11a has the head portion 12a opposed to the recess 13a from its right upper portion and to the gap 44 from its right lower portion. The upper connecting rod bolt 11a has an axis an extension line 45a of which goes rightwards and upwards to pass through the gap 44 and the opening 41.

As shown in FIG. 2, at the specific observation position, with the larger-diameter end portion 7 of the connecting rod arranged at the stroke intermediate position above the center axis 1 of the crank shaft, the lower connecting rod bolt 11b has the head portion 12b facing the gap 46 from its right portion. The connecting rod bolt 11b has an axis an extension line 45b of which goes rightwards and downwards to pass through the gap 46 and the opening 41.

The engine as set forth in each of claims 1 to 8 is adaptable to a horizontal engine having the cylinder 2 oriented horizontal, a vertical engine having the cylinder 2 oriented vertical, and an inclined engine having the cylinder 2 oriented slant. In any case, observation is made at the specific observation position with the cylinder 2 oriented horizontal on the left side of the center axis 1 of the crank shaft when seen in a direction parallel to the cylinder axis 1 of the crank shaft to judge if it satisfies the featuring matter stated in each of claims.

Especially, claim 2 concerns an engine where at the specific observation position, as exemplified in FIG. 1, with the piston 24 existing at the bottom dead center, the weight connection portion 15a of the upper rotary balancer 4a has a left upper portion provided with the other recess 13b which will become vertically symmetric with respect to the recess 13a and is sandwiched by the both recesses 13a and 13b to form a capital letter "T" in section.

As exemplified in FIG. 1, especially the invention of claim 3 makes an inner surface of the recess 13a arcuate at the specific observation position. The invention of claim 4 forms the lower rotary balancer 4b into the same structure as that of the upper rotary balancer 4a. As illustrated in FIG. 6, the invention of claim 5 is adapted to an engine where the upper rotary balancer 4a has a bearing 17 internally fitted into a bearing hole 16 closed at its inner end. As shown in FIG. 1, the invention of claim 6 relates to an engine where an oil reservoir 18 is formed below the connecting rod 5 and a lower surface 20 of the larger-diameter end portion, which runs axially of the lower connecting rod bolt 11b, is connected to a lower surface 21 of the connecting rod 5 which runs along the center axis 6 of the connecting rod, without bypassing via an angled shoulder of the larger-diameter end portion 7 of the connecting rod 5 when it is adapted to a horizontal engine which rotates the larger-diameter end portion 7 of the connecting rod in a clockwise direction 19 at the specific observation position.

As exemplified in FIG. 6, the invention of claim 7 concerns an engine which enables an oil pump 36 to supply oil to a space between the crank pin 8 and the larger-diameter end portion 7 of the connecting rod 5. As exemplified in FIG. 1, the invention of claim 8 concerns an engine where at the specific observation position, with the center axis 6 of the connecting rod 5 oriented horizontal, the pair of upper and lower cap segment surfaces 9a and 9b of the larger-diameter end portion 7 of the connecting rod are positioned at the upper and lower portions of crank pin 8 and are inclined so that they have a vertical line oriented in a direction defined through rotating it by an angle of 20 degrees to 40 degrees in the clockwise direction.

EFFECT OF THE INVENTION

INVENTION OF CLAIM 1

<Effect 1> The Cap Can be Attached and Detached Quickly.

As exemplified in FIGS. 3 and 4, when conducting the maintenance of the piston 24 or the like, there is a case where with the paired rotary balancers 4a and 4b assembled to the cylinder block 22, the pair of connecting rod bolts 11a and 11b are removed by a socket wrench 47 to detach the cap 10 and thereafter the cap 10 is assembled to attach the pair of upper and lower connecting rod bolts 11a and 11b by the socket wrench 47. In this case, the paired upper and lower connecting rod bolts 11a and 11b can be detached and attached at once. This results in the possibility of promptly attaching and detaching the cap 10.

More specifically, when the cap 10 is removed, first, after the engine has been brought into a state where the piston 24 is present at the bottom dead center as shown in FIG. 3, the straight socket wrench 47 is inserted into the cylinder block 22 through the opening 41 and the socket 48 at its leading end is inserted from the gap 44 along the extension line 45a of the axis of the upper connecting rod bolt 11a. The head portion 12a of the upper connecting rod bolt 11a is fitted into the socket 48 and the socket wrench 47 is rotated to dismantle the upper connecting rod bolt 11a at once. At this time, even if the head portion 12a of the upper connecting rod bolt 11a extremely approaches the weight connection portion 15a of the upper rotary balancer 4a, the recess 13a enables the socket 48 to avoid the interference with the weight connection portion 15a of the upper rotary balancer 4a. Next, after the engine has been brought into a state where the larger-diameter end portion 7 is present at the stroke intermediate position as shown in FIG. 4, the same socket wrench 47 and one hand are inserted into the cylinder block 22 through the opening 41 and the gap 46. The head portion 12b of the lower connecting rod bolt 11b is fitted into the socket 48 at the leading end of the socket wrench 47. Then while supporting the cap 10 by one hand so that it does not fall, the socket wrench 47 is rotated to dismantle the lower connecting rod bolt 11b at once.

Next, when the cap 10 is attached after the predetermined maintenance work, first, the engine has been brought into the state where the larger-diameter end portion 7 is present at the stroke intermediate position as shown in FIG. 4. Then the socket wrench 47 has the socket 48 into which the head portion 12b of the lower connecting rod bolt 11b is fitted. While having the cap 10 by one hand and the socket wrench 47 by the other hand, these are inserted toward the crank pin 8 through the opening 41 and the gap 46. While supporting the cap 10 by one hand so that it does not fall, the socket wrench 47 is rotated by the other hand to attach the lower connecting rod bolt 11b at once. Subsequently, after the engine has been brought into the state where the piston 24 is present at the bottom dead center as shown in FIG. 3, the head portion 12a of the upper connecting rod bolt 11a is fitted into the socket 48 of the same socket wrench 47, which is inserted toward the cap 10 through the opening 41 and the gap 44 to attach the upper connecting rod bolt 11a at once.

<Effect 2> It Is Possible to Produce the Engine at a Lower Cost and to Enable the Larger-Diameter End Portion of the Connecting Rod to Avoid the Interference with the Constituent Parts of the Engine.

When the engine of high exhaust amount is produced by borrowing the cylinder block 22 to be used for the engine of low exhaust amount as exemplified in FIG. 7 and making the radius 23 from the center axis 1 of the crank shaft 3 to the center of the crank pin 8 larger than that of the engine of low exhaust amount and making the dimension 27 from the piston pin 25 to the piston head top surface 27 smaller than that of the engine of low exhaust amount as shown in FIG. 1, if the structure of the present invention is adopted for the engine of high exhaust amount, the engine can be produced at a lower cost. More specifically, as exemplified in FIG. 1, if the structure of the present invention is adopted for the engine of high exhaust amount, as shown in FIG. 10, while the engine is in operation, the head portion 12a of the upper connecting rod bolt 11a does not interfere with the upper portion 28a of the crank shaft 3 and the other portions in the crank case 28 without using smaller ones for the larger-diameter end portion 7 of the connecting rod 5 and the connecting rod bolt 11a. Thus a high explosion pressure accompanying the attempt to increase the exhaust amount can be received by the larger-diameter end portion 7 of the connecting rod 5 and the connecting rod bolt 11a without problem, which in turn enables the engine of high exhaust amount to be produced by using the cylinder block 22 to be used for the engine of low exhaust amount with the result of reducing the production cost of the engine.

Further, the cap segment surfaces 9a and 9b are inclined from the right upper portion to the left lower portion, which results in hardly forming an angled shoulder at the larger-diameter end portion 7 of the connecting rod 5. Thus even if the engine of high exhaust amount as exemplified in FIG. 1 is produced by borrowing the cylinder block 22 of the engine of low exhaust amount illustrated in FIG. 7, the larger-diameter end portion 7 of the connecting rod 5 can avoid the interference with the constituent parts (for example, a valve operating cam shaft 39 and the like) of the engine arranged at the same positions as those of the engine of low exhaust amount.

<Effect 3> Lubricating Performance is High Within the Crank Case.

As exemplified in FIG. 1, the oil sprinkled within the crank case 28 is splashed back by the inner surface of the recess 13a of the upper rotary balancer 4a to come to be fine oil mist, which floats within the crank case 28. This enhances the lubricating performance within the crank case 28.

INVENTION OF CLAIM 2

<Effect 4> The Lubricating Performance Becomes Higher Within the Crank Case.

As illustrated in FIG. 1, since there is provided the other recess 13b which is vertically symmetric with respect to the recess 13a, when compared with the case where only the recess 13a is provided, there are more portions which splash back the oil, with the result of producing more oil mist to further enhance the lubricating performance within the crank case 28.

<Effect 5> It is Possible to Secure a Necessary Strength for the Rotary Balancer.

As illustrated in FIG. 1, the weight connection portion 15a is sandwiched by the recesses 13a and 13b to form a capital letter "T" in section. This results in securing a necessary strength for the rotary balancer 4a.

INVENTION OF CLAIM 3

<Effect 6> It is Possible to Enhance the Strength of the Connection Portion.

As exemplified in FIG. 1, since at the specific observation position, the recess 13a has its inner surface made arcuate, the connection portion 15 can have a higher strength than the case where the recess 13a has a bent inner surface, by an amount corresponding to the absence of the concentration of stress.

INVENTION OF CLAIM 4

<Effect 7> The Lubricating Performance is More Enhanced Within the Crank Case.

As exemplified in FIG. 1, there are more portions which splash back the oil than the case where only one rotary balancer 4a is provided with the recess 13a, which results in producing more oil mist. This more enhances the lubricating performance within the crank case 28.

<Effect 8> The Upper and Lower Rotary Balancers can be Made Common to Each Other As illustrated in FIG. 1, the upper and lower rotary balancers are formed into the same structure to result in making the upper and lower rotary balancers common to one anther. This prevents the upper and lower rotary balancers from being attached by mistake and besides facilitates the control of parts.

INVENTION OF CLAIM 5

<Effect 9> The Lubricating Performance is Remarkably Improved.

As illustrated in FIG. 6, in the case where the rotary balancer 4a has the bearing 17 internally fitted into the bearing hole 16 closed at its inner end, originally oil mist hardly invades the bearing 17 of the rotary balancer 14a and therefore a high lubricating performance is unexpectable. However, in the case of the present invention, more oil mist is produced within the crank case 8 with the result of being able to obtain a high lubricating performance. Thus the lubricating performance is remarkably improved.

INVENTION OF CLAIM 6

<Effect 10> The Oil is Consumed in a Smaller Amount and the Larger-Diameter End Portion of the Connecting Rod can Avoid the Interference with the Constituent Parts of the Engine.

As shown in FIG. 1, when adapting this invention to a, horizontal engine where the oil reservoir 18 is formed below the connecting rod 5 and at the specific observation position, the larger-diameter end portion 7 of the connecting rod 5 is rotated in the clockwise direction 19, the lower surface 20 of the larger-diameter end portion 7, which runs axially of the lower connecting rod bolt 11b is connected to the lower surface 21 of the connecting rod 5, which runs along the center axis 6 of the connecting rod 5 without bypassing via the angled shoulder of the larger-diameter end portion 7 of the connecting rod 5. In consequence, when compared with the case where they are connected to each other through such angled shoulder, the oil invades from the cylinder 2 to a combustion chamber in quantity reduced by an amount in which such shoulder would have splashed the oil or the waved oil within the oil reservoir 18 over the cylinder 2. This results in decreasing the oil consumption amount.

Further, the larger-diameter end portion 7 of the connecting rod 5 does not have the angled shoulder. Thus even if the engine of high exhaust amount as shown in FIG. 1 is produced by borrowing the cylinder block 22 of the engine of low exhaust amount as shown in FIG. 7, the larger-diameter end portion 7 of the connecting rod 5 can avoid the interference with the constituent parts of the engine (for example, the valve operating cam shaft 39 and the like) arranged at the same positions as those of the engine of low exhaust amount.

INVENTION OF CLAIM 7

<Effect 11> The Lubricating Performance is High Within the Crank Case.

As exemplified in FIG. 6, the oil can be supplied by the oil pump 36 to the space between the crank pin 8 and the larger-diameter end portion 7 of the connecting rod 5. Therefore, when the oil which has leaked out of the space between the crank pin 8 and the large-diameter end portion 7 of the connecting rod is sprinkled around the crank shaft 3 upon the rotation of the same, part of the sprinkled oil is splashed back by the inner surface of the recess 13a of the rotary balancer 4a to become fine oil mist, which floats within the crank case 28. This enhances the lubricating performance within the crank case 28.

INVENTION OF CLAIM 8

<Effect 12> It is Possible to Put the Invention into Practice Without any Trouble.

As exemplified in FIG. 1, the paired upper and lower cap segment surfaces 9a and 9b are positioned at the upper and lower portions of the crank pin 8 and are inclined so that they are oriented in a direction defined through rotating their vertical line by an angle of 20 degrees to 40 degrees in the clockwise direction 19. Therefore, the invention can be put into practice without any trouble.

More specifically, with the inclination angle of less than 20 degrees, there is a likelihood that the head portion 12a of the upper connecting rod bolt 11a interferes with the upper portion 28a of the crank case 28 unless the larger-diameter end portion 7 of the connecting rod 5 and the upper connecting rod bolt 11a are made quite small. Further, with the inclination angle of not less than 40 degrees, the socket 48 of the socket wrench 47 which has been inserted through the gap 44 cannot be fitted onto the head portion 12a of the upper connecting rod bolt 11a. On the other hand, with the inclination angle within the range of 20 degrees to 40 degrees, even if the larger-diameter end portion 7 of the connecting rod 5 and the upper connecting rod bolt 11a are formed large enough to withstand the high explosion pressure of the engine of high exhaust amount, there occurs no problem and therefore the invention can be put into practice without any trouble.

DESCRIPTION OF PREFERRED EMBODIMENTS

An embodiment of the present invention is explained based on the drawings.

In this embodiment, an explanation is given for an engine of high exhaust amount. The engine of high exhaust amount is produced by borrowing the cylinder block to be used for an engine of low exhaust amount.

Any one of FIGS. 1 to 6 explains an engine of high exhaust amount according to the embodiment of the present invention. An explanation is given by utilizing a horizontal diesel engine in this embodiment.

This engine is outlined as follows.

Figure 1:
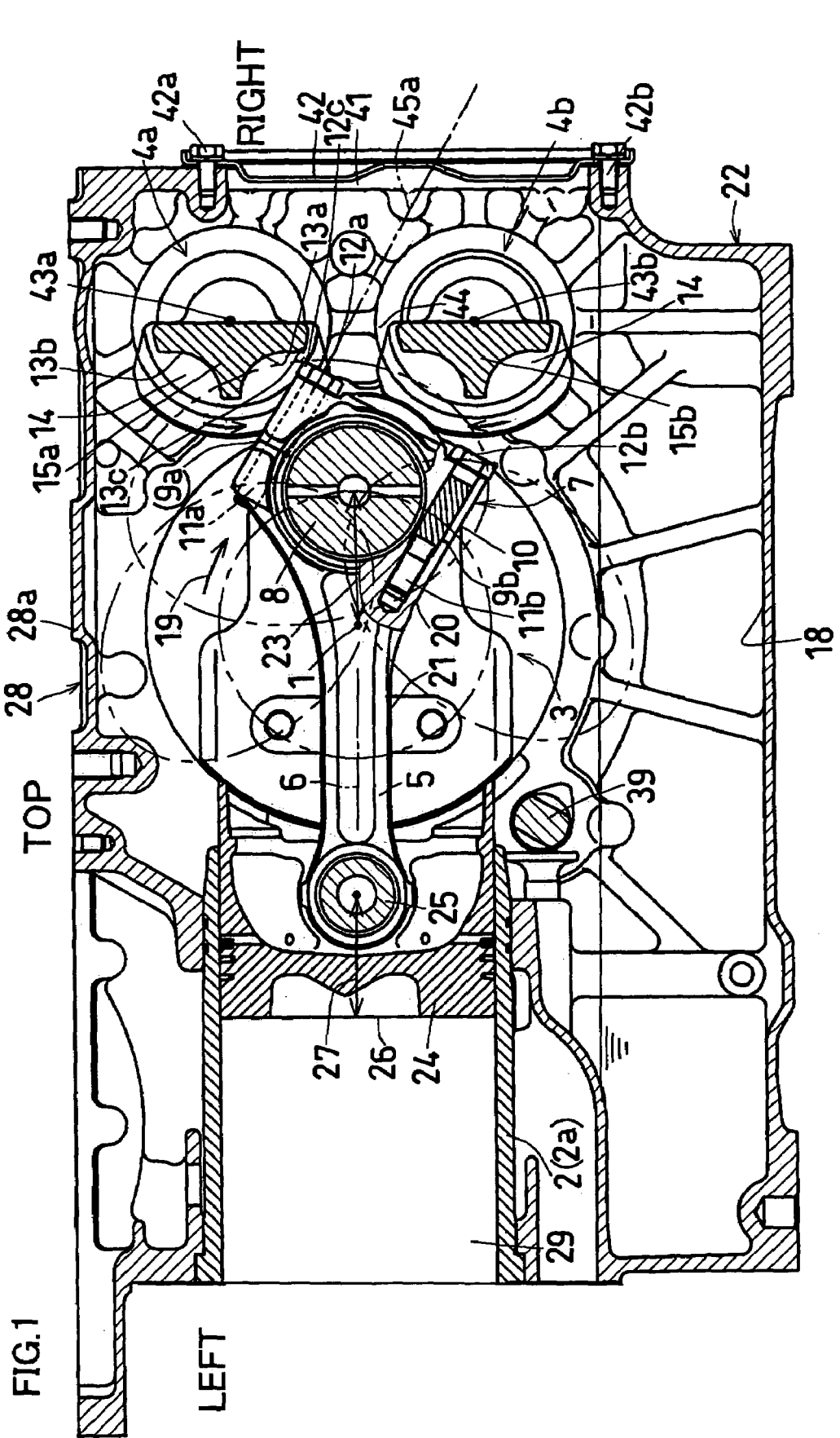
FIG. 1 is a front view, in vertical section, of a cylinder block and its inner portion of an engine of high exhaust amount according to an embodiment of the present invention when a piston is at a bottom dead center.
Figure 5:
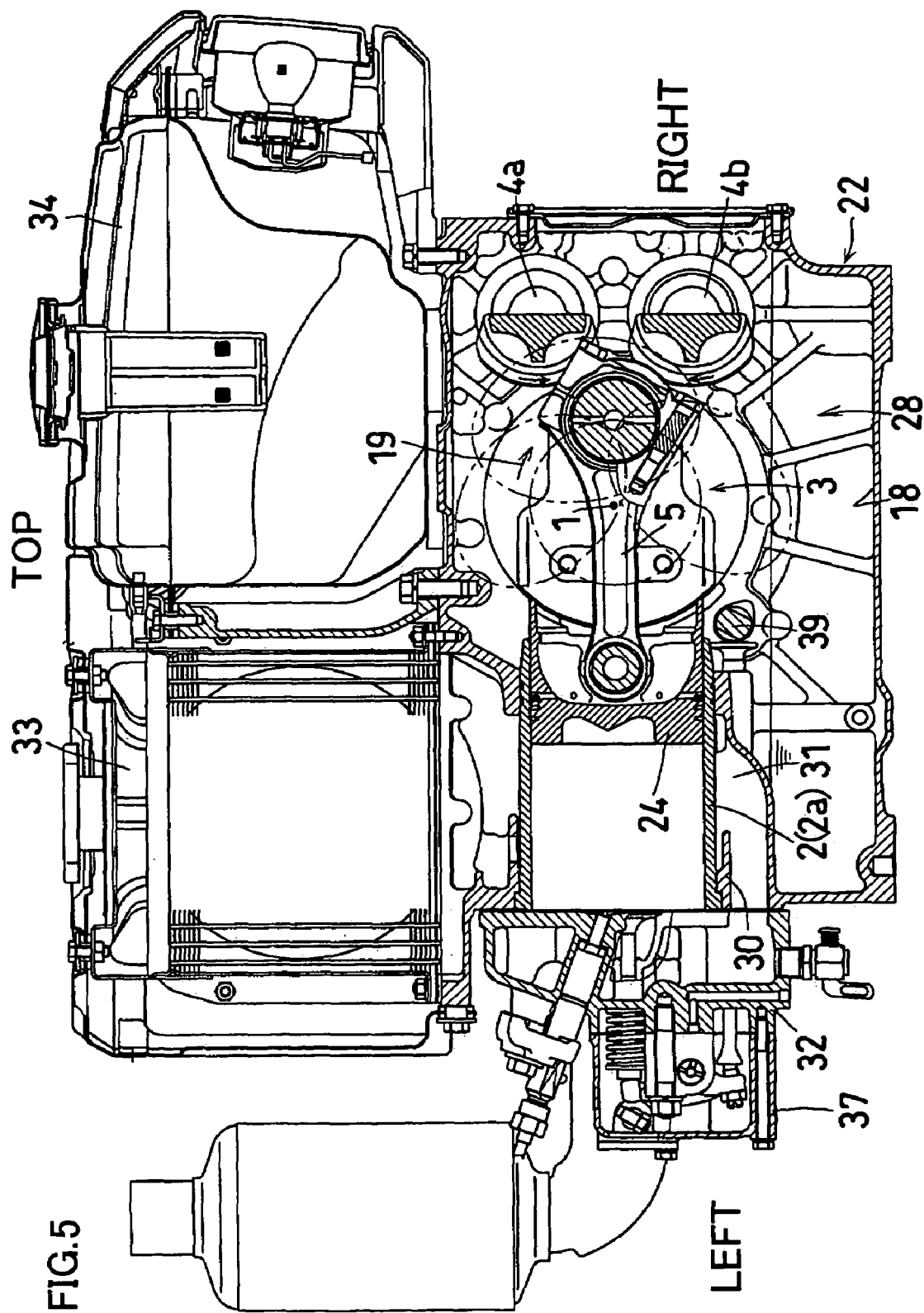
FIG. 5 is a front view, in vertical section, of the whole engine provided with the cylinder block as shown in FIG. 1.

As shown in FIG. 5, when seen in a direction parallel to a center axis 1 of a crank shaft 3, at a specific observation position with a cylinder 2 oriented horizontal on a left side of the center axis 1 of the crank shaft 3, a pair of upper and lower rotary balancers 4a and 4b are arranged on a right horizontal side of the crank shaft 3. A cylinder block 22 comprises a crank case 28, an oil reservoir 18 disposed below the crank case 28, a cylinder liner attaching portion 30 on a left side of the crank case 28 and a cylinder jacket 31 surrounding the cylinder liner attaching portion 30. As shown in FIG. 1, the crank case 28 accommodates the crank shaft 3 and the pair of upper and lower rotary balancers 4a and 4b. The cylinder block 22 has a right end wall provided with an opening 41, through which connecting rod bolts 11a and 11b can be assembled and detached. A closure 21 covers the opening 41 and is attached detachably by bolts 42a and 42b. The paired upper and lower balancers 4a and 4b are arranged vertically symmetric with respect to a horizontal plane which passes by the center axis 1 of the crank shaft 3.

The paired upper and lower rotary balancers 4a and 4b are primary balancers each of which makes one rotation while the crank shaft 3 makes one rotation. At the specific observation position, while the crank shaft 3 rotates in a clockwise direction 19, the upper rotary balancer 4a rotates in a counter-clockwise direction and the lower rotary balancer 4b rotates in the clockwise direction. As shown in FIG. 5, the cylinder block 22 has a left end to which a cylinder head 32 is assembled. A head cover 37 is assembled to the cylinder head 32. At an upper portion of the cylinder block 22, a radiator 33 which communicates with the cylinder jacket 31 is arranged above the cylinder jacket 31 and a fuel tank 34 is disposed above the crank case 28.

Figure 2:
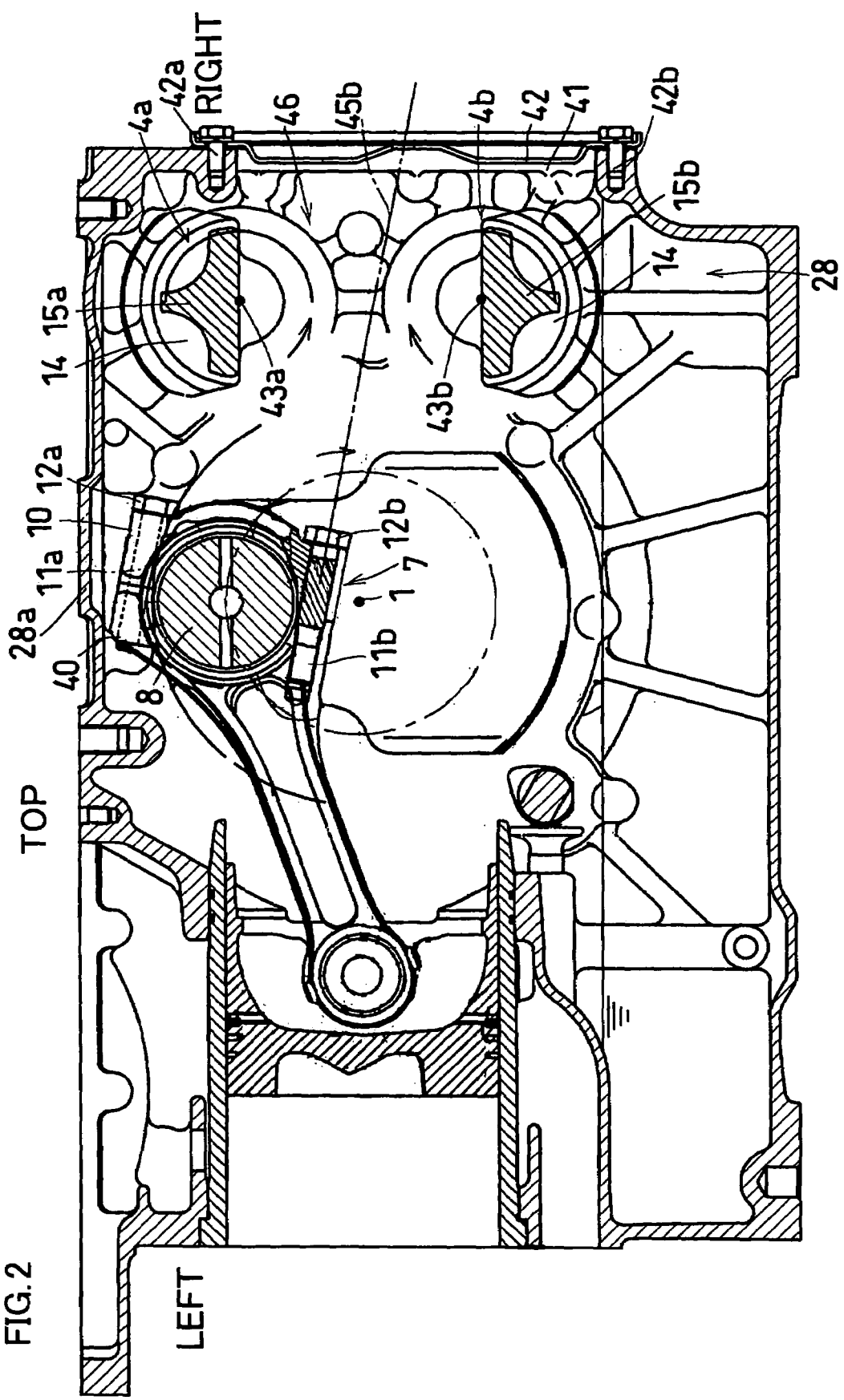
FIG. 2 is a front view, in vertical section, of the cylinder block and its inner portion shown in FIG. 1 when a larger-diameter end portion is at a stroke intermediate position.
Figure 3:
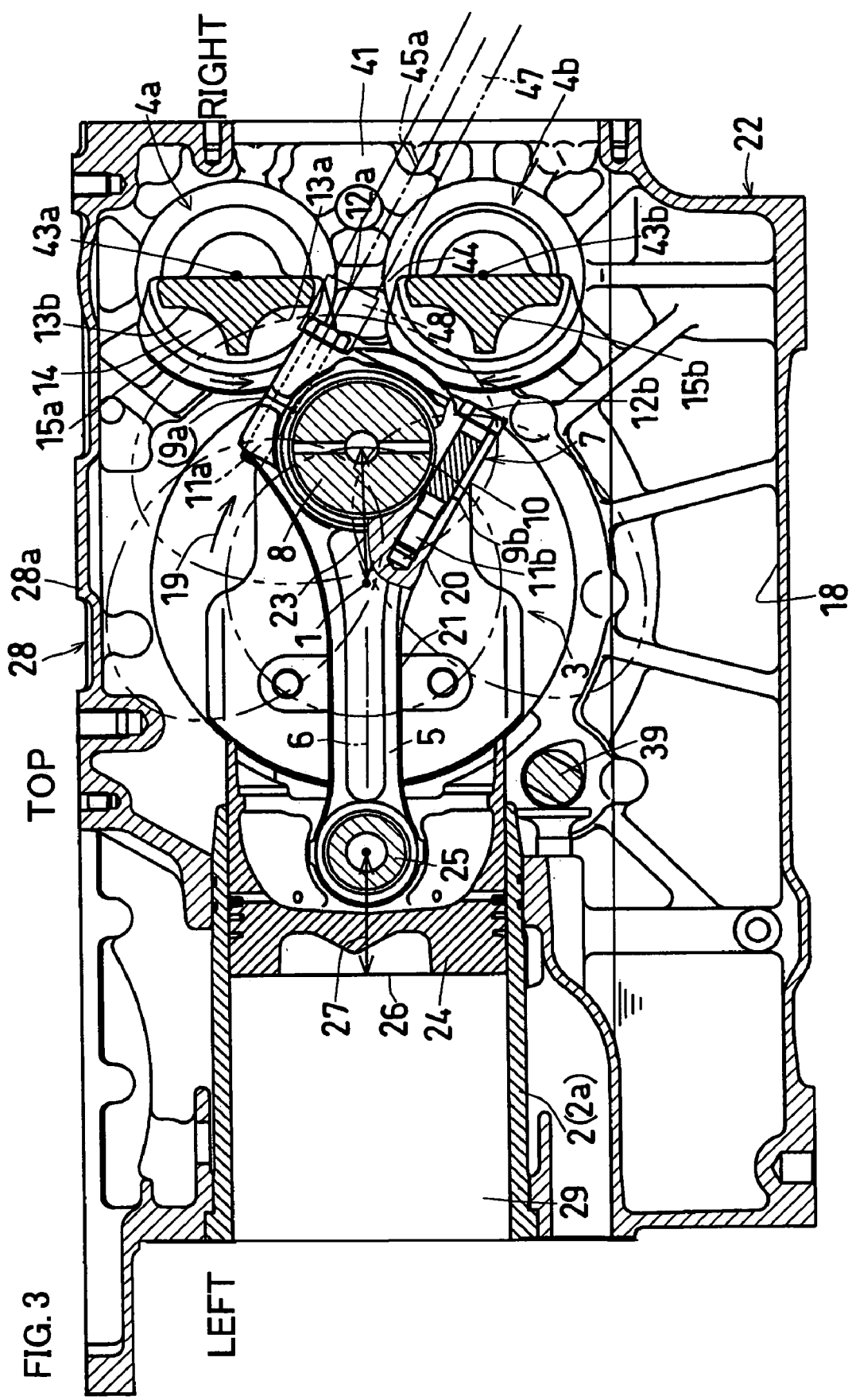
FIG. 3 is similar to FIG. 1 when a cap is attached and detached.
Figure 4:
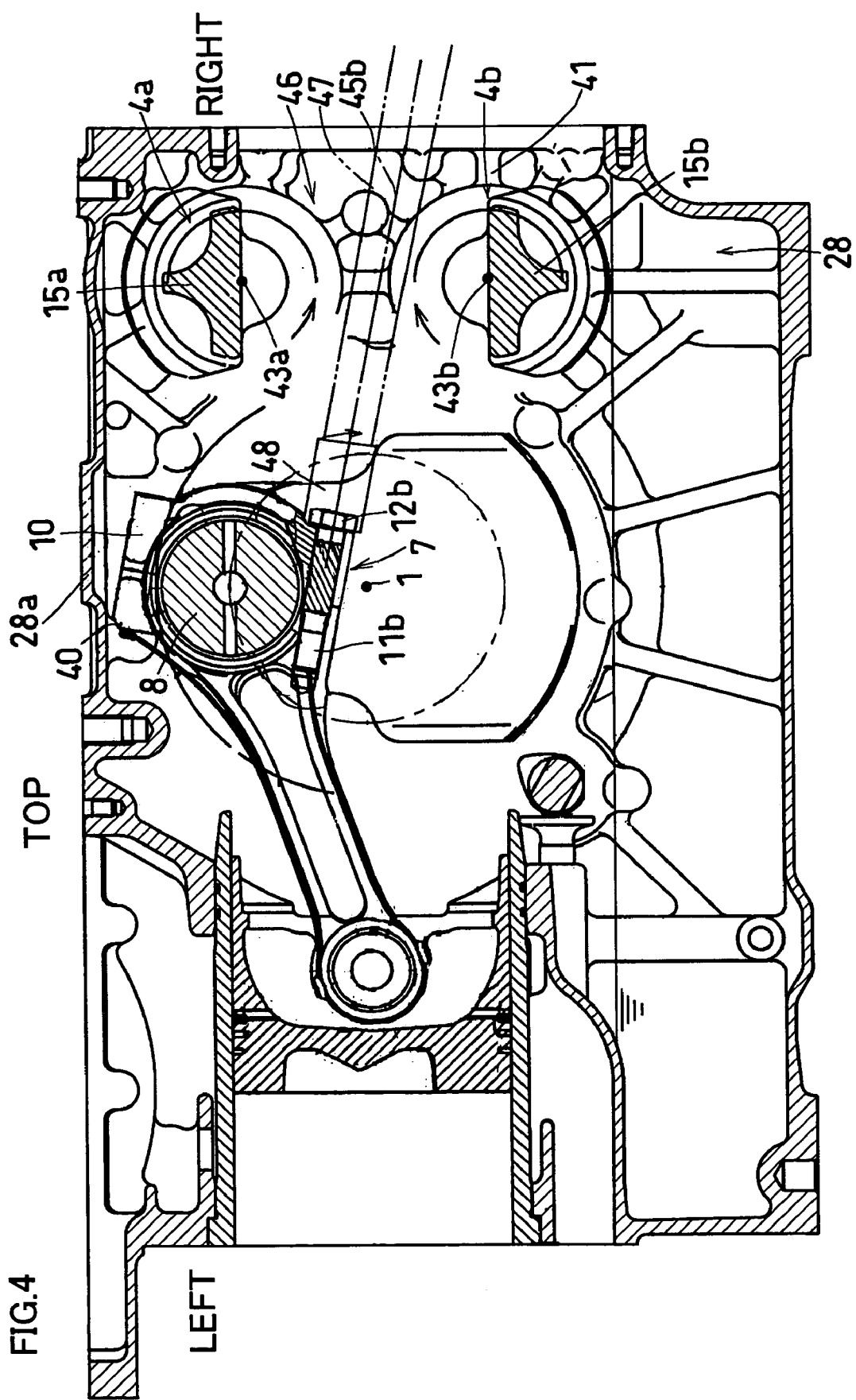
FIG. 4 is similar to FIG. 2 when the cap is attached and detached.
Figure 6:
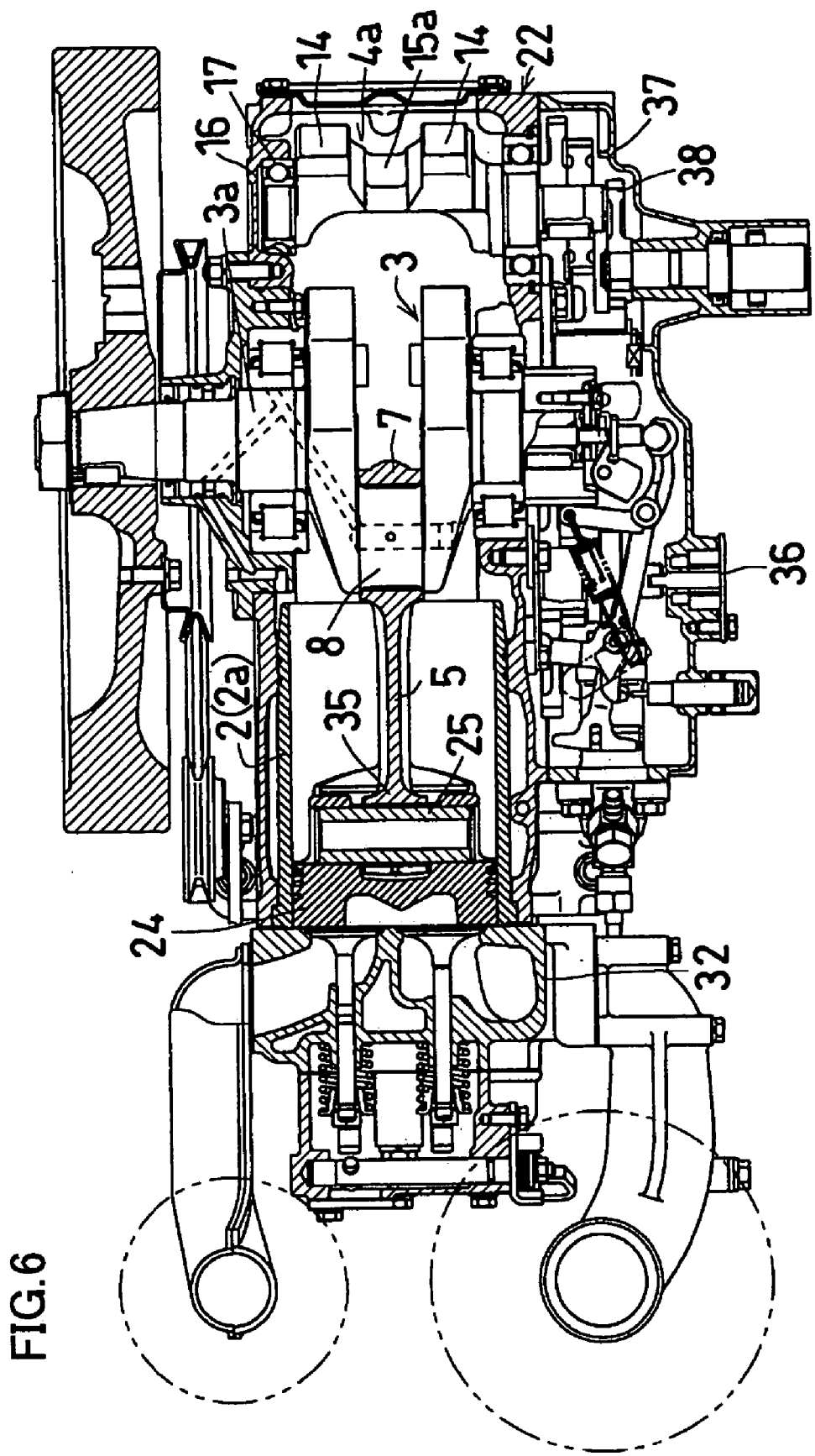
FIG. 6 is a plan view, in cross section, of the engine shown in FIG. 5.

As shown in FIG. 5, used for the cylinder 2 is a cylinder liner 2a attached to the cylinder liner attaching portion 30. A piston 24 is internally fitted into the cylinder liner 2a. The crank shaft 3 is interlockingly connected to the piston 24 through a connecting rod 5. A valve operating cam shaft 39 is arranged at a left lower portion of the crank shaft 3 below the cylinder liner 2a. As shown in FIG. 6, a smaller-diameter end portion 35 of the connecting rod 5 is connected to the piston 24 by a piston pin 25. A larger-diameter end portion 7 of the connecting rod 5 is connected to the crank shaft 3 by a crank pin 8. An oil pump 36 can supply oil to a journal portion 3a of the crank shaft 3 and the crank pin 8. Further, the upper rotary balancer 4a is provided with a weight connection portion 15a between weight portions 14 and 14. This cylinder block 22 has a front end portion, to which a gear case 37 is assembled. This gear case 37 accommodates a timing transmission gear 38. As shown in FIG. 1, at the specific observation position, with the piston 24 existing at a bottom dead center, the paired upper and lower rotary balancers 4a and 4b have the respective weight connection portions 15a and 15b positioned on left horizontal sides of centers 43a and 43b of the respective balancers. A gap 44 is formed between the both weight connection portions 15a and 15b when the piston 24 is present at the bottom dead center. As illustrated in FIG. 2, at the specific observation position, with the larger-diameter end portion 7 of the connecting rod 5 existing at a stroke intermediate position above the center axis 1 of the crank shaft 3, the upper rotary balancer 4a has the weight connection portion 15a positioned above the rotation center 43a of the balancer 4a and the lower rotary balancer 4b has the weight connection portion 15b arranged below the rotation center 43b of the balancer 4b. A gap 46 is formed between the both weight connection portions 15a and 15b of the paired upper and lower rotary balancers 4a and 4b when the larger-diameter end portion 7 is present at the stroke intermediate position.

The connecting rod 5 is constructed as follows.

As shown in FIG. 1, at the specific observation position, with a center axis 6 of the connecting rod 5 oriented horizontal, a pair of upper and lower cap segment surfaces 9a and 9b of the larger-diameter end portion 7 of the connecting rod 5 are positioned at an upper and a lower portions of the crank pin 8 and are inclined from a right upper portion of the larger-diameter end portion 7 of the connecting rod 5 to a left lower portion thereof. A cap 10 is attached by a pair of upper and lower connecting rod bolts 11a and 11b, head portions 12a and 12b of which are vertically arranged along the inclination direction of the paired upper and lower cap segment surfaces 9a and 9b. A lower surface 20 of the larger-diameter end portion 7, which runs axially of the lower connecting rod bolt 11b is connected to a lower surface 21 of the connecting rod 5, which runs along the center axis 6 of the connecting rod 5, without bypassing via an angled shoulder of the larger-diameter end portion 7 of the connecting rod 5. The lower surface 20 of the larger-diameter end portion 7 makes an obtuse angle with the lower surface 21 of the connecting rod 5.

The upper rotary balancer 4a is constructed as follows.

As shown in FIG. 1, at the specific observation position, with the piston 24 existing at the bottom dead center, the weight connection portion 15a of the upper rotary balancer 4a is provided with a recess 13a at a left lower portion which opposes to the head portion 12a of the upper connecting rod bolt 11a. An oil pump 36 as shown in FIG. 6 can feed oil to a space between the crank pin 8 and the larger-diameter end portion 7 of the connecting rod 5.

Further, as shown in FIG. 1, at the specific observation position, with the piston 24 being present at the bottom dead center, the recess 13a is made to face the head portion 12a of the upper connecting rod bolt 11a from a right upper portion thereof and the gap 44 from a right lower portion thereof. This upper connecting rod bolt 11a has an axis an extension line 45a of which goes rightwards and downwards to pass through the gap 44 and the opening 41. The recess 13a has a lower corner angled portion 13c opposed to a right upper corner angled portion 12c of the head portion 12a of the upper connecting rod bolt 11a from the just right horizontal portion thereof. Moreover, while the engine is in operation, the recess 13 enables the rotary balancer 4a to avoid the interference with the head portion 12a of the upper connecting rod bolt 11a. Therefore, when the piston is at the bottom dead center, the upper connecting rod bolt 11a has the head portion 12a extremely close to the weight connection portion 15a of the upper rotary balancer 4a. However, when detaching and attaching the upper connecting rod bolt 11a, the recess 13a prevents the socket 48 of the socket wrench 47 from interfering with the weight connection portion 15a of the upper rotary balancer 4a.

Additionally, as shown in FIG. 2, at the specific observation position, with the larger-diameter end portion 7 of the connecting rod 5 existing at the stroke intermediate position above the center axis 1 of the crank shaft 3, the lower connecting rod bolt 11b has the head portion 12b opposed to the gap 46 from its right portion. The connecting rod bolt 11b has an axis an extension line 45b which goes rightwards and downwards to pass through the gap 46 and the opening 41.

As shown in FIG. 1, at the specific observation position, with the piston 24 being present at the bottom dead center, the weight connection portion 15a of the upper rotary balancer 4a is provided at its left upper portion with the other recess 13b which becomes vertically symmetric with respect to the recess 13a. The weight connection portion 15a is sandwiched by the both recesses 13a and 13b to form a capital letter "T" in section. As illustrated in FIG. 1, at the specific observation position, either of the recesses 13a and 13b has its inner surface made arcuate. Therefore, it is sufficient if the weight connection portion 15a is carved only by a small amount as if it were carved along a locus of the upper connecting rod bolt 12a. The lower rotary balancer 4b has the same structure as that of the upper rotary balancer 4a. As shown in FIG. 6, the bearing 17 of the upper rotary balancer 4a is internally fitted into the bearing hole 16 closed at its inner end. This is same to the bearing of the lower rotary balancer 4b.

Further, as shown in FIG. 1, at the specific observation position, with the center axis 6 of the connecting rod 5 oriented horizontal, the paired upper and lower cap segment surfaces 9a and 9b of the larger-diameter end portion 7 are positioned at the upper and lower portions of the crank pin 8 and are inclined in a direction defined through rotating their vertical line by 30 degrees in the clockwise direction. This angle is preferably 20 degrees to 40 degrees and more preferably, 20 degrees to 35 degrees.

The above-mentioned engine is produced by the following procedures.

Figure 7:
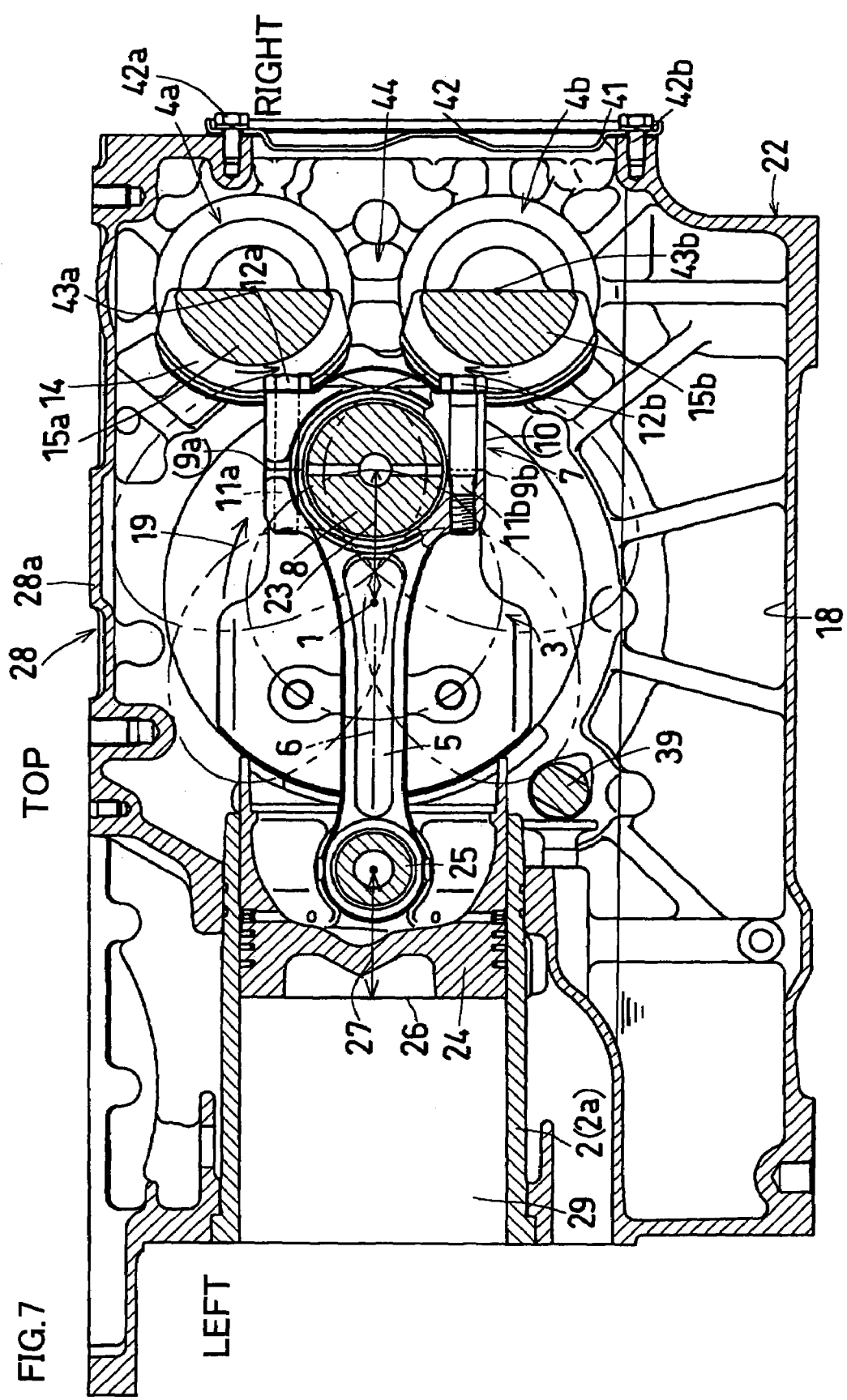
FIG. 7 is a front view, in vertical section of a cylinder block and its inner portion of an engine of low exhaust amount, to be used for producing the engine according to the embodiment of the present invention.

According to this method, the engine of high exhaust amount is produced by borrowing a cylinder block 22 and a valve operating cam shaft 39 to be used for the engine of low exhaust amount as shown in FIG. 7 and making a radius 23 from a center axis 1 of a crank shaft 3 to a center of a crank pin 8 larger than that of the engine of low exhaust amount and making a dimension 27 from a center of a piston pin 25 to a piston head top surface 26 smaller than that of the engine of low exhaust amount as shown in FIG. 1. Further, an outer diameter of a piston 24 is made larger than that of the engine of low exhaust amount as well as inner and outer diameters of a cylinder liner 2a.

The engine of low exhaust amount is common to the engine of high exhaust amount in the following main structures.

As shown in FIG. 7, when seen in a direction parallel to the center axis 1 of the crank shaft 3, at the specific observation position with the cylinder 2 oriented horizontal on a left side of the center axis 1 of the crank shaft 3, a pair of upper and lower rotary balancers 4a and 4b are arranged on a right horizontal side of the crank shaft 3. The pair of upper and lower rotary balancers 4a and 4b have a right horizontal side provided with an opening 41, which is covered with a closure 42.

At the specific observation position, with the piston 24 existing at the bottom dead center, the paired upper and lower rotary balancers 4a and 4b have respective weight connection portions 15a and 15b positioned on a left horizontal sides of centers 43a and 43b of the respective balancers. And a gap 44 is formed between the both weight connection portions 15a and 15b when the piston 24 is present at the bottom dead center.

Like in FIG. 2, at the specific observation position, with a larger-diameter end portion 7 of a connecting rod 5 being present at a stroke intermediate position above the center axis 1 of the crank shaft 3, the upper rotary balancer 4a has the weight connection portion 15a positioned above its rotation center 43a and the lower rotary balancer 4b has the weight connection portion 15b arranged below its rotation center 43b. A gap 46 is formed between the both weight connection portions 15a and 15b of the paired rotary balancers 4a and 4b when the larger-diameter end portion 7 of the connecting rod 5 is present at the stroke intermediate position. The valve operating cam shaft 39 is disposed at a left lower portion of the crank shaft 3 below a cylinder liner 2a. The same cylinder block 22 and the same valve operating cam shaft 39 are used. The paired rotary balancers 4a and 4b are arranged in the same manner as well as the valve operating cam shaft 39. In FIGS. 7 to 14, the same elements as those of the engine of high exhaust amount as shown in FIGS. 1 to 6 are designated by the same reference characters.

The engine of low exhaust amount is different from the engine of high exhaust amount on the following structures.

As shown in FIG. 7, at the specific observation position, with the center axis 6 of the connecting rod 5 oriented horizontal, the paired upper and lower cap segment surfaces 9a and 9b of the larger-diameter end portion 7 of the connecting rod 5 are positioned at an upper and a lower portions of the crank pin 8 and are made vertical. A cap 10 is attached by a pair of upper and lower connecting rod bolts 11a and 11b, head portions 12a and 12b of which are vertically arranged along the formation direction of the paired upper and lower cap segment surfaces 9a and 9b. The paired upper and lower rotary balancers 4a and 4b are not provided with such recesses as used in the engine of high exhaust amount. The piston 24 and the cylinder liner 2a are different from those of the engine of high exhaust amount in dimension. In short, an outer diameter of the piston 24 is smaller than that of the engine of high exhaust amount as well as inner and outer diameters of the cylinder liner 2a. In addition, as shown in FIG. 7, the radius 23 from the center axis 1 of the crank shaft 3 to the center of the crank pin 8 is made smaller than that of the engine of high exhaust amount and the dimension 27 from the center of the piston pin 25 to the piston head top surface 26 is made larger than that of the engine of high exhaust amount.

The engine of high exhaust amount is produced by the following concrete method.

Figure 8:
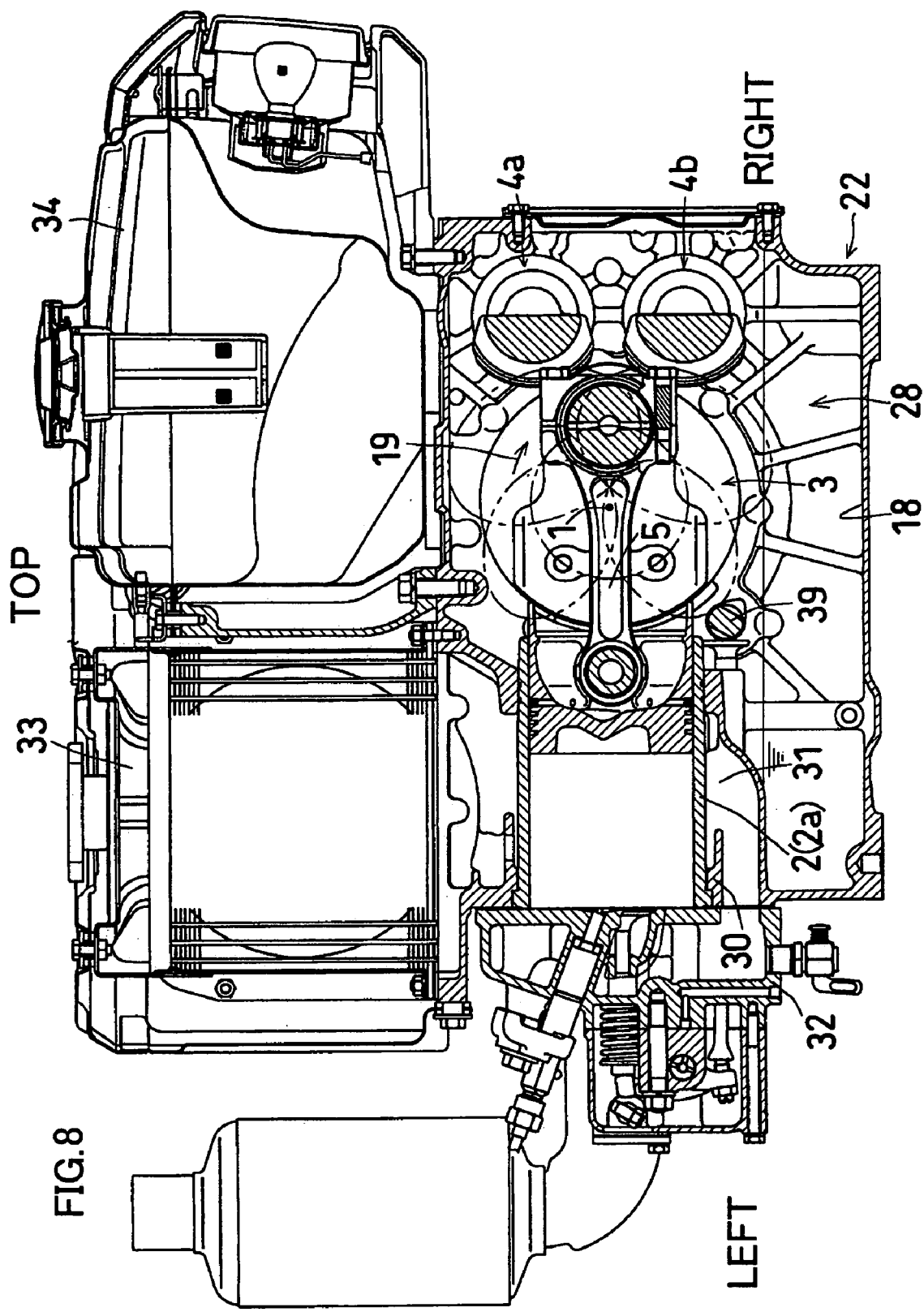
FIG. 8 is a front view, in vertical section, of the whole engine provided with the cylinder block shown in FIG. 7.
Figure 9:
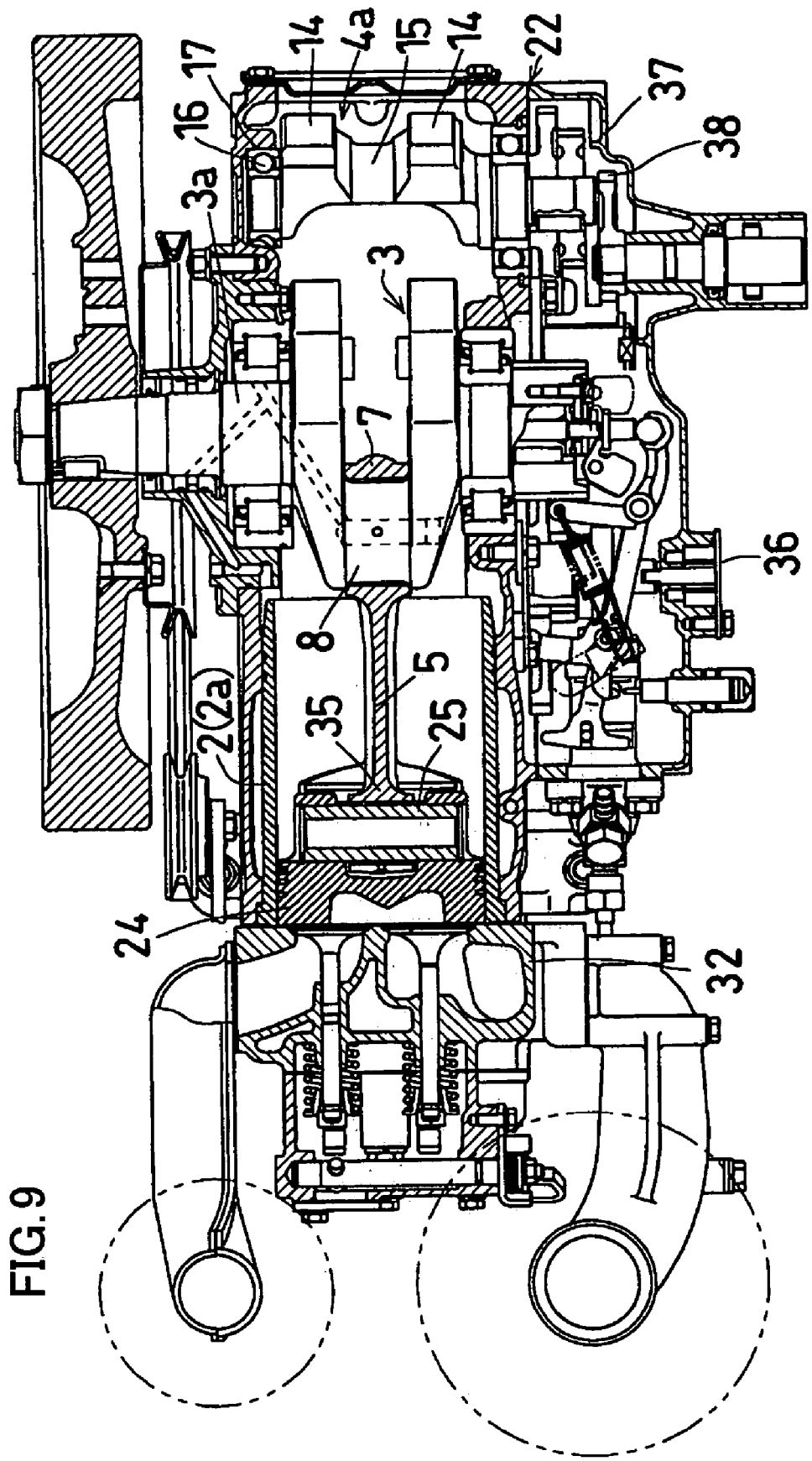
FIG. 9 is a plan view, in cross section, of the engine as shown in FIG. 8.

The engine as shown in FIGS. 1 to 6 is produced by employing the cylinder block 22 and the valve operating cam shaft 3 to be used for the engine of low exhaust amount as shown in FIGS. 7 to 9 as main borrowed parts and utilizing the piston 24, the cylinder liner 2a, the connecting rod 5, the crank shaft 3, and the paired upper and lower rotary balancers 4a and 4b as exclusive parts. As for the other parts such as the cylinder head 32, the radiator 33, the fuel tank 34 and the like, they are borrowed from the engine of low exhaust amount. Since the cylinder liner 2a has the outer diameter made larger than that of the engine of low exhaust amount, the cylinder liner attaching portion 30 has its inner surfaced carved more than in the case of the engine of low exhaust amount to widen the inner diameter.

When borrowing the cylinder block 22 and the valve operating cam shaft 39 to be used for the engine of low exhaust amount as shown in FIG. 7, as illustrated in FIG. 1, at the specific observation position, with the valve operating cam shaft 39 arranged at a position lower than the center axis 1 of the crank shaft 3, the lower surface 20 of the larger-diameter end portion 7, which runs axially of the lower connecting rod bolt 11b, is connected to the lower surface 21 of the connecting rod 5 which runs along the center axis 6 of the connecting rod 5, without bypassing via an angled shoulder of the larger-diameter end portion 7 of the connecting rod 5, thereby enabling the larger-diameter end portion 7 of the connecting rod 5 to avoid the interference with the valve operating cam shaft 39 arranged in the same manner as in the engine of low exhaust amount.

Figure 10:
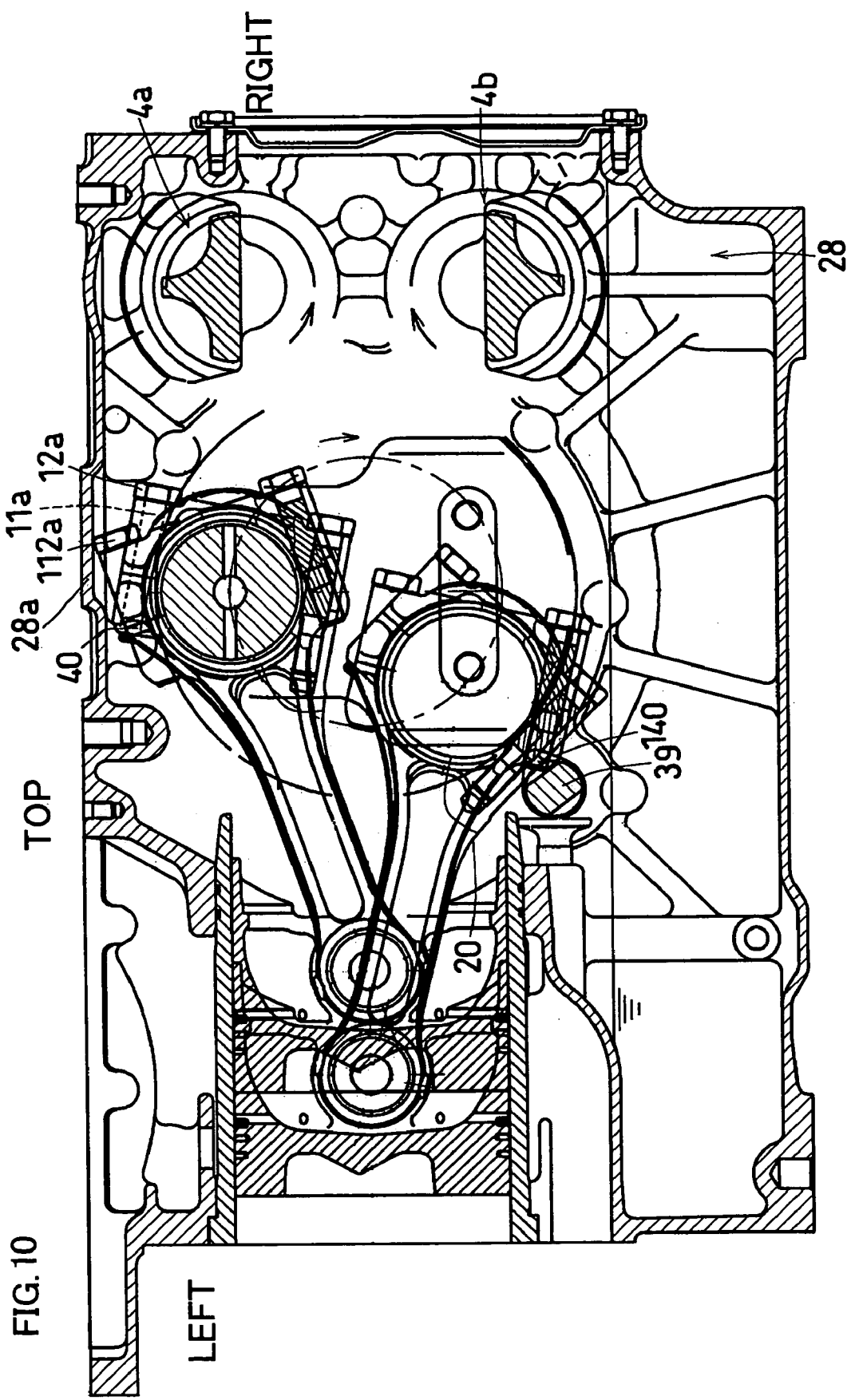
FIG. 10 explains whether or not a connecting rod bolt and a larger-diameter end portion of a connecting rod interfere with the other parts in the case of assembling the connecting rod with cap segment surfaces inclined, to the engine provided with the cylinder block shown in FIG. 1 and in the case of assembling a connecting rod of the same structure as that of a conventional technique.
Figure 11:
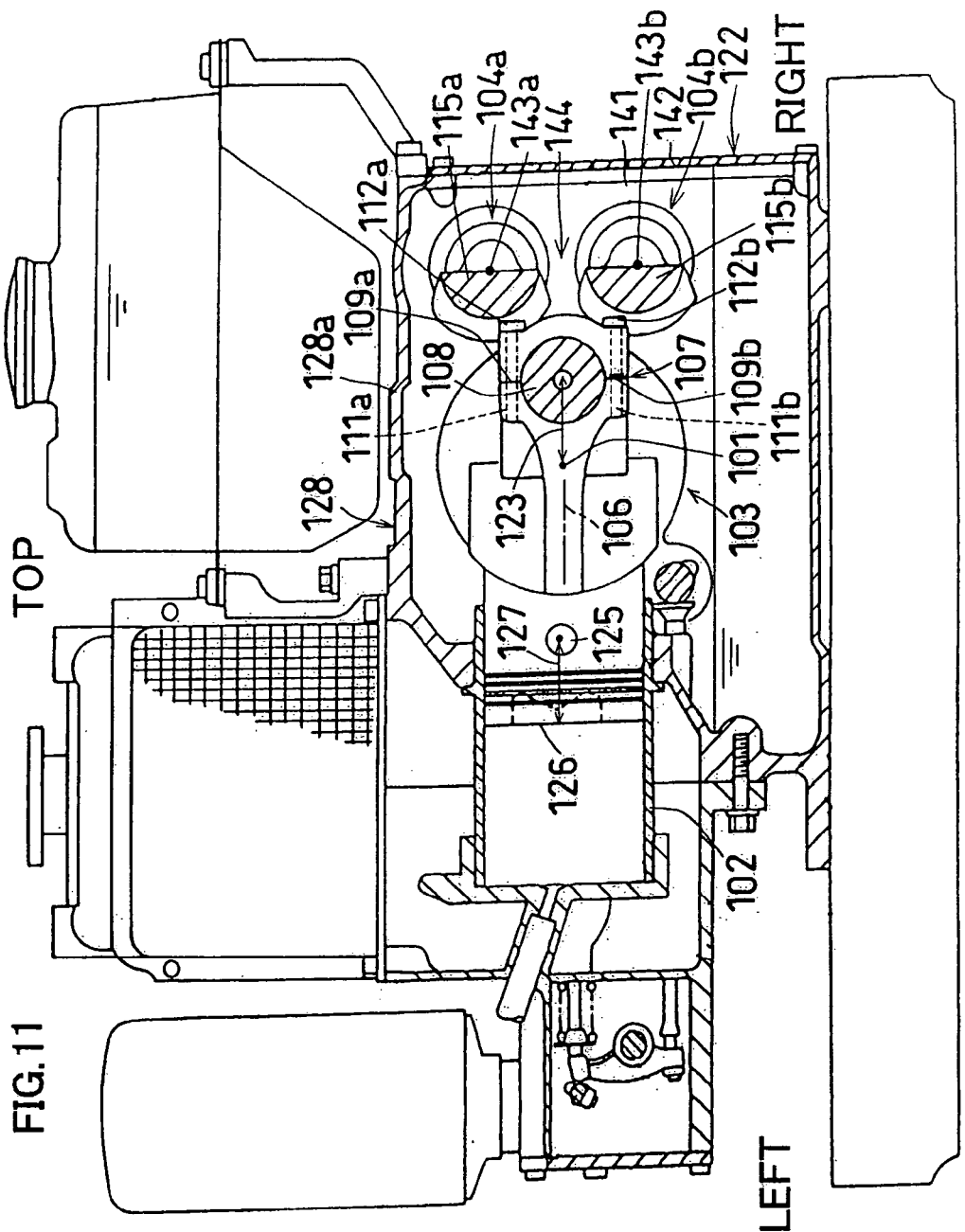
FIG. 11 is a front view, in vertical section, of an engine according to the conventional technique.
Figure 12:
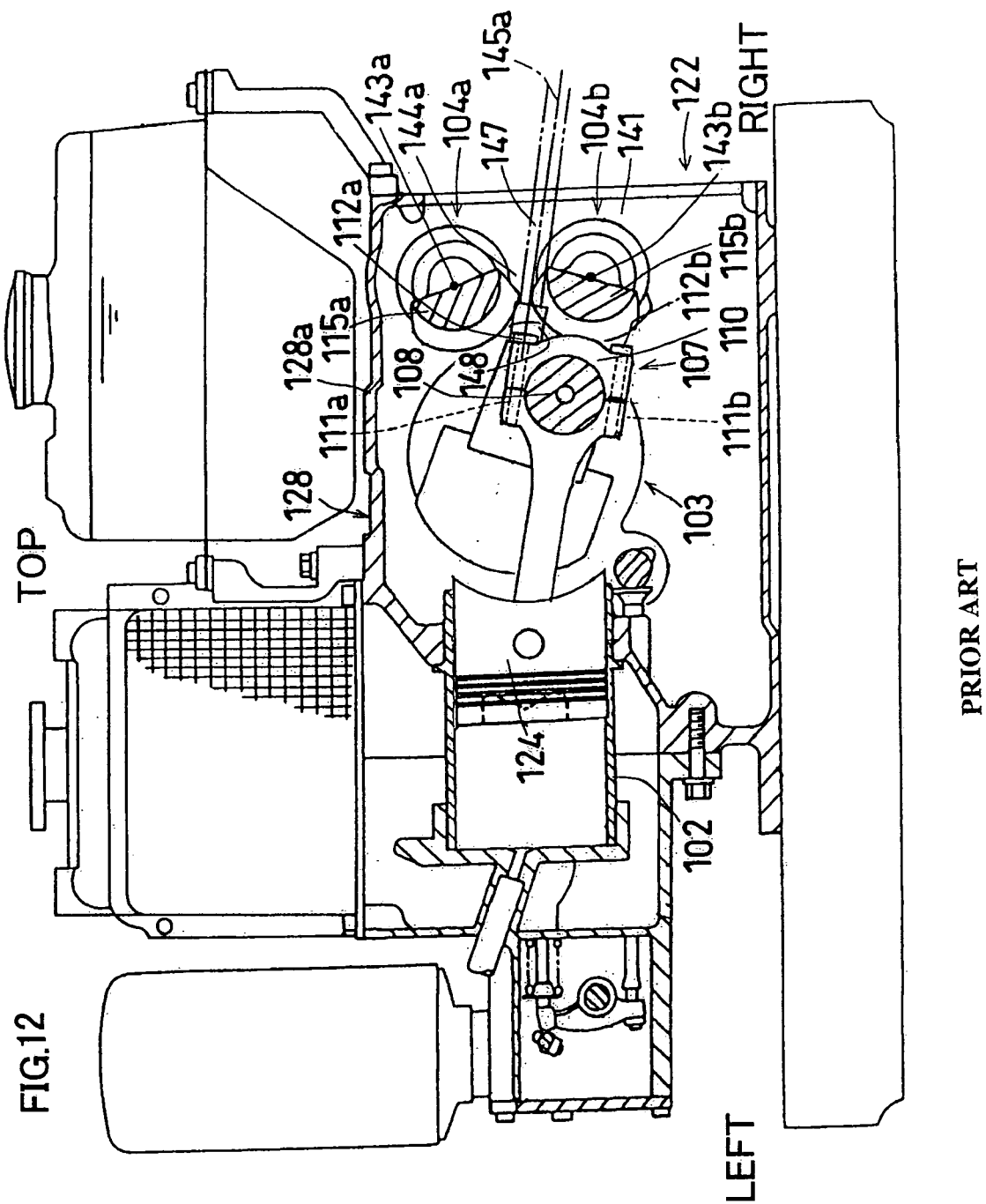
FIG. 12 explains a state where the piston has just passed the bottom dead center when attaching and detaching a cap by a conventional work.
Figure 13:
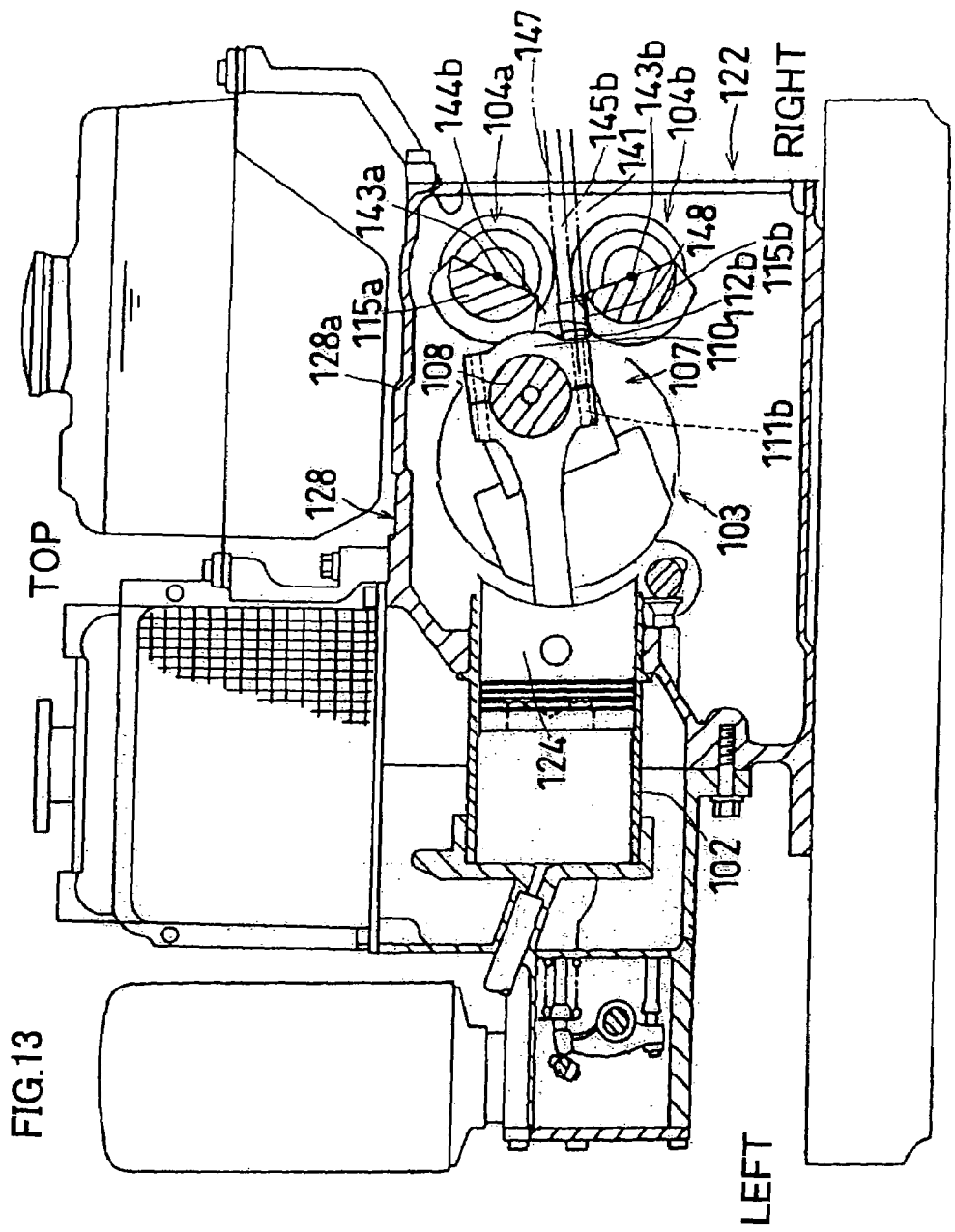
FIG. 13 explains a state just before the piston passes the bottom dead center when attaching and detaching the cap by the conventional work.
Figure 14:
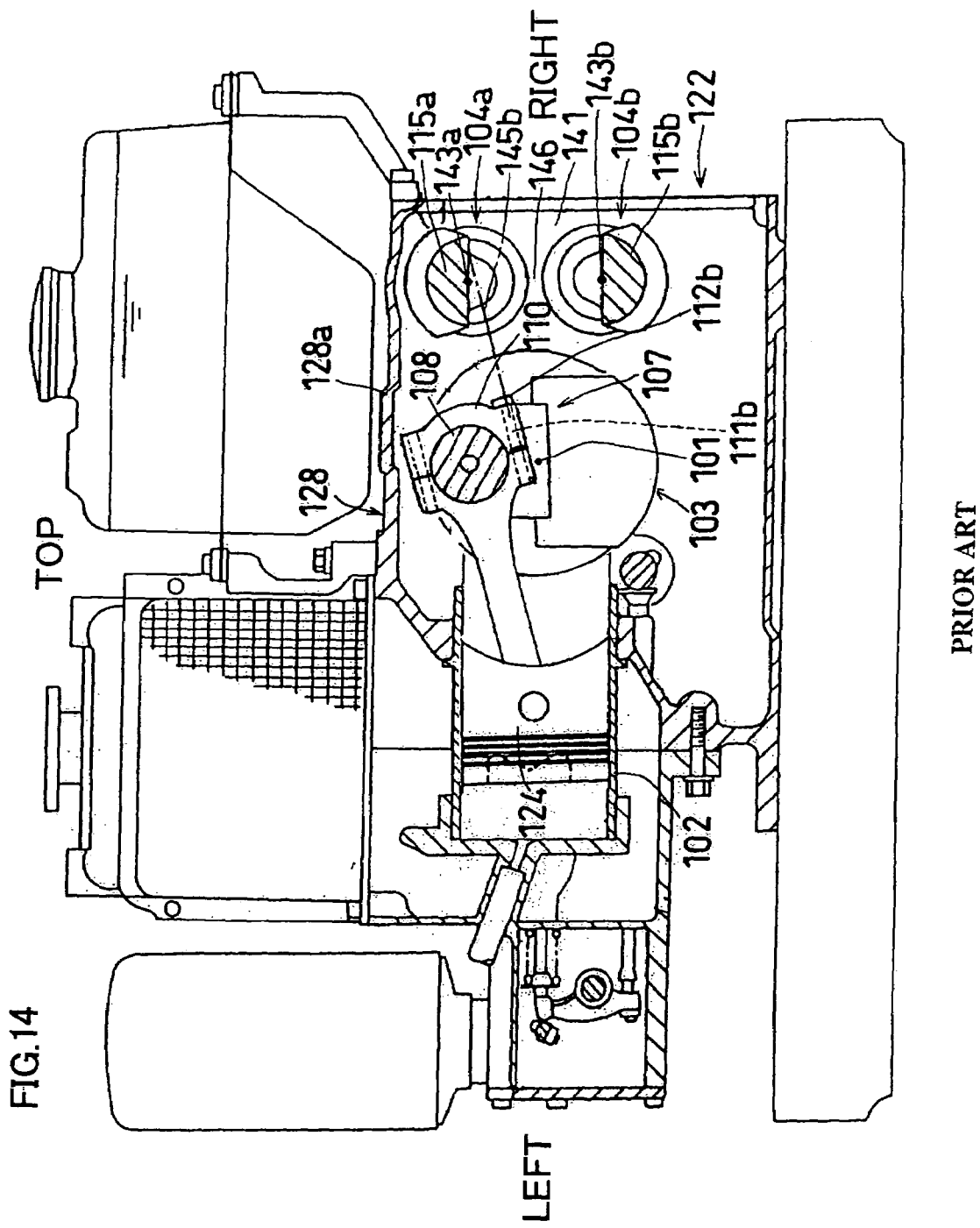
FIG. 14 explains a stroke intermediate position when attaching and detaching the cap by the conventional work.

In the case of adopting the above-mentioned production method, as shown in FIG. 10, the head portion 12a of the upper connecting bolt 11a and a shoulder 40 at an upper portion of the larger-diameter end portion 7 of the connecting rod 5 do not interfere with the upper portion 28a of the crank shaft 3 in the crank case 28. The lower surface 20 of the larger-diameter end portion 7 of the connecting rod 5 does not interfere with the valve operating cam shaft 39 arranged in the same manner as in the engine of low exhaust amount as well.

As illustrated in FIG. 10, differently from the embodiment of the present invention, in the event that a connecting rod of the same structure as that of the conventional technique is used, the head portion 112a of the upper connecting rod bolt interferes with the upper portion 28a of the crank shaft 3 in the crank case 28 and the shoulder 140 at a lower portion of the larger-diameter end portion of the connecting rod interferes with the valve operating cam shaft 39 arranged in the same manner as in the engine of low exhaust amount.

What is claimed is:

1. An engine comprising a pair of upper and lower rotary balancers (4a)(4b) arranged on a right horizontal side of a crank shaft (3) at a specific observation position with a cylinder (2) oriented horizontal on a left side of a center axis (1) of the crank shaft (3) when seen in a direction parallel to the center axis (1) of the crank shaft (3), the paired upper and lower rotary balancers (4a) (4b) having a right horizontal side provided with an opening (41) of a cylinder block (22), which is covered with a closure (42), at the specific observation position, with a piston (24) existing at a bottom dead center, the paired upper and lower rotary balancers (4a) (4b) having weight connection portions (15a)(15b) positioned on a left horizontal side of centers (43a)(43b) of the respective balancers, a gap (44) being formed between the both weight connection portions (15a)(15b) when the piston (24) is present at the bottom dead center, at the specific observation position, with a larger-diameter end portion (7) of a connecting rod (5) existing at a stroke intermediate position above the center axis (1) of the crank shaft (3), the upper rotary balancer (4a) having the weight connection portion (15a) positioned above the rotation center (43a) of the balancer (4a) and the lower rotary balancer (4b) having the weight connection portion (15b) disposed below the rotation center (43b) of the balancer (4b), a gap (46) being formed between the both weight connection portions (15a) (15b) of the paired upper and lower rotary balancers (4a)(4b) when the larger-diameter end portion (7) is present at the stroke intermediate position, wherein at the specific observation position, with the center axis (6) of the connecting rod (5) oriented horizontal, a pair of upper and lower cap segment surfaces (9a)(9b) of the larger-diameter end portion (7) of the connecting rod (5) are positioned at an upper and a lower portions of the crank pin (8) and are inclined from a right upper portion of the larger-diameter end portion (7) of the connecting rod (5) to a left lower portion thereof, a cap (10) being attached by a pair of upper and lower connecting rod bolts (11*a*)(11*b*), head portions (12*a*)(12*b*) of which are vertically arranged along the inclination direction of the paired upper and lower cap segment surfaces (9*a*)(9*b*);

at the specific observation position, with the piston (24) existing at the bottom dead center, the weight connection portion (15*a*) of the upper rotary balancer (4*a*) is provided with a recess (13*a*) at a left lower portion which opposes to the head portion (12*a*) of the upper connecting rod bolt (11*a*);

at the specific observation position, with the piston (24) existing at the bottom dead center, the recess (13*a*) opposes to the head portion (12*a*) of the upper connecting rod bolt (11*a*) from a right upper portion of the latter and the gap (44) opposes to the head portion (12*a*) from a right lower portion thereof, this upper connecting rod bolt (11*a*) having an axis an extension line (45*a*) of which goes rightwards and downwards to pass through the gap (44) and the opening (41); and at the specific observation position, with the larger-diameter end portion (7) of the connecting rod (5) being present at the stroke intermediate position above the center axis (1) of the crank shaft (3), the gap (46) opposes the head portion (12*b*) of the lower connecting rod bolt (11*b*) from a right portion of the latter, the connecting rod bolt (11*b*) having an axis an extension line (45*b*) of which goes rightwards and downwards to pass through the gap (46) and the opening (41).

2. The engine as set forth in claim 1, wherein at the specific observation position, with the piston (24) existing at the bottom dead center, the weight connection portion (15*a*) of the upper rotary balancer (4*a*) is provided at its left and upper portion with the other recess (13*b*) which is vertically symmetric with respect to the recess (13*a*), and is sandwiched by the both recesses (13*a*)(13*b*) to form a capital letter "T" in section.

3. The engine as set forth in claim 1, wherein at the specific observation position, the recess (13*a*) has its inner surface made arcuate.

4. The engine as set forth in claim 1, wherein the lower rotary balancer (4*b*) has the same structure as that of the upper rotary balancer (4*a*).

5. The engine as set forth in claim 1, which is adapted to an engine wherein the upper rotary balancer (4*a*) has a bearing (17) internally fitted into a bearing hole (16) closed at its inner end.

6. The engine as set forth in claim 1 wherein an oil reservoir (18) is formed below the connecting rod (5) and when it is adapted to a horizontal engine which rotates the larger-diameter end portion (7) of the connecting rod (5) in a clockwise direction (19) at the specific observation position, a lower surface (20) of the larger-diameter end portion (7) which runs axially of the lower connecting rod bolt (11*b*) is connected to a lower surface (21) of the connecting rod (5) which runs along the center axis (6) of the connecting rod (5), without bypassing via an angled shoulder of the larger-diameter end portion (7) of the connecting rod (5).

7. The engine as set forth in claim 1 wherein an oil pump (36) supplies oil to a space between the crank pin (8) and the larger-diameter end portion (7) of the connecting rod (5).

8. The engine as set forth in claim 1 wherein at the specific observation position, with the center axis (6) of the connecting rod (5) oriented horizontal, the paired upper and lower cap segment surfaces (9*a*)(9*b*) of the larger-diameter end portion (7) of the connecting rod (5) are positioned at the upper and lower portions of the crank pin (8) and are inclined in a direction defined through rotating their vertical line by an angle of 20 degrees to 40 degrees in a clockwise direction.

* * * * *